United States Patent [19]

Hastings

[11] Patent Number: 4,861,096
[45] Date of Patent: Aug. 29, 1989

[54] UTILITY VEHICLE

[76] Inventor: John M. Hastings, P.O. Box 39, Shepherd, Tex. 75243

[21] Appl. No.: 219,655

[22] Filed: Jul. 15, 1988

[51] Int. Cl.⁴ .......................... B60R 3/00; B62D 25/00
[52] U.S. Cl. ..................................... 296/183; 296/36; 296/97.22; 296/151; 280/834
[58] Field of Search ................. 296/146, 183, 202, 36, 296/97.22, 151, 106, 62; 280/5 A

[56] References Cited

U.S. PATENT DOCUMENTS

| | | | |
|---|---|---|---|
| 2,761,523 | 9/1956 | Lee | 280/5 A |
| 2,772,913 | 12/1956 | Holan et al. | 296/183 |
| 3,400,974 | 9/1968 | Gage | 296/146 |
| 4,746,089 | 5/1988 | Clapper | 296/97.22 |

OTHER PUBLICATIONS

"Automobile Engineer" Nov. 1959, p. 412.

Primary Examiner—Robert B. Reeves
Assistant Examiner—John M. Gruber
Attorney, Agent, or Firm—Bernard A. Reiter

[57] ABSTRACT

A pickup truck bed with a vertically hinged passenger door mounted in a side panel thereof. The door permits passenger ingress and egress to the bed area, and conceals a gas cap behind the door and under the bed. Access to the gas cap and ingress and egress is controlled by a locking mechanism operatively associated with the door.

17 Claims, 1 Drawing Sheet

UTILITY VEHICLE

FIELD OF THE INVENTION

The present invention relates to a utility vehicle such as a pickup truck, particularly to a pickup truck bed for use therein which has a passenger door mounted in the side thereof.

BACKGROUND OF THE INVENTION

A pickup truck typically has an open bed encircled by up-standing walls. In order for a passenger to gain access to the bed, it is usually necessary for the passenger to climb over the walls of the bed or use a horizontally hinged tailgate positioned at the rear of the vehicle. The use of the tailgate is still a cumbersome procedure since the tailgate typically opens to the same elevation as the bed which is usually relatively high to permit a passenger to readily step from the ground surface adjacent the tailgate to the tailgate. Moreover, the tailgate is horizontally hinged and opens down over any rear bumper which may be placed at the rear of the bed so that the bumper cannot be used as a step to facilitate entry of the passenger into the bed.

The fuel tank of a pickup truck is typically mounted on the frame underneath the bed of the pickup truck. Access to the fuel tank is typically through a port positioned on the side wall of the bed which feeds into the fuel tank through a line concealed in the wall of the bed. The port is usually concealed in the wall of the pickup truck bed by a hinged access cover. However, the hinged access cover creates a discontinuity of the surface of the pickup truck bed wall, and it can be readily discerned for unauthorized access, for example, by one attempting to steal fuel from the tank.

Accordingly, there is a need for a pickup truck bed which permits facilitated access of a passenger thereto, and which also and discretely permits access to the fuel port.

SUMMARY OF THE INVENTION

The present invention provides a pickup truck bed having a vertically hinged passenger door in a side thereof. A fuel tank port may be aesthetically and discretely concealed between the door and the bed of the pickup truck. In one aspect, the invention provides a utility vehicle which has a passenger cab and a frame extending lengthwise behind the cab. A bed is mounted on top of the frame extending from adjacent the cab to a tail end. Upstanding first and second side panels are secured to opposite sides of the bed and extend substantially along the bed from adjacent the cab to adjacent the tail end. A vertically hinged door is positioned in one or both of the side panels for passenger access to the bed. A port for filling a fuel tank concealed beneath the bed is provided. The port is positioned below an upper surface of the bed and behind the door for concealment of the port when the door is in a closed position, and access thereto when the door is in an opened position. The vehicle is preferably a pickup truck with the side panels extending vertically above and below the bed. The door is preferably a passenger-style door, and a step may be provided on the side panel below the door. The door may conveniently extend vertically from adjacent the step to a top of the side panel. The door may have a top edge even with a top edge of the side panel. The door preferably opens outward from the bed. The fuel port preferably includes a gas cap such as, for example, a threadedly engaged gas cap.

In another aspect, the invention provides a bed mountable on a pickup truck. The bed has a floor with a forward end, a tail end and opposite longitudinal sides extending therebetween. A generally vertical side body member is attached at each bed side. A vertically hinged door is mounted in one or both of the side body members. The door has a closed position wherein the side body member is continuous generally from the forward end to the tail end. The door has an open position wherein a portal for passenger access vertically extensive above the bed is formed in the side body member. Means are further provided for receiving a fuel tank line mounting a cap on the end thereof between the door and the bed side to conceal the gas cap behind the door in the closed position and to provide access to the gas cap in the open position. The door is preferably a passenger door and means for stepping is mounted on the side body member beneath the door. The bed may also include a horizontally hinged gate mounted at the tail end of the floor, e.g. a tailgate. The bed may also include a wall at the forward end of the floor. Locking means for locking the door in the closed position may also be provided. The bed preferably has an open top.

DETAILED DESCRIPTION OF THE PREFERRED EMBODIMENTS

Figure 1:
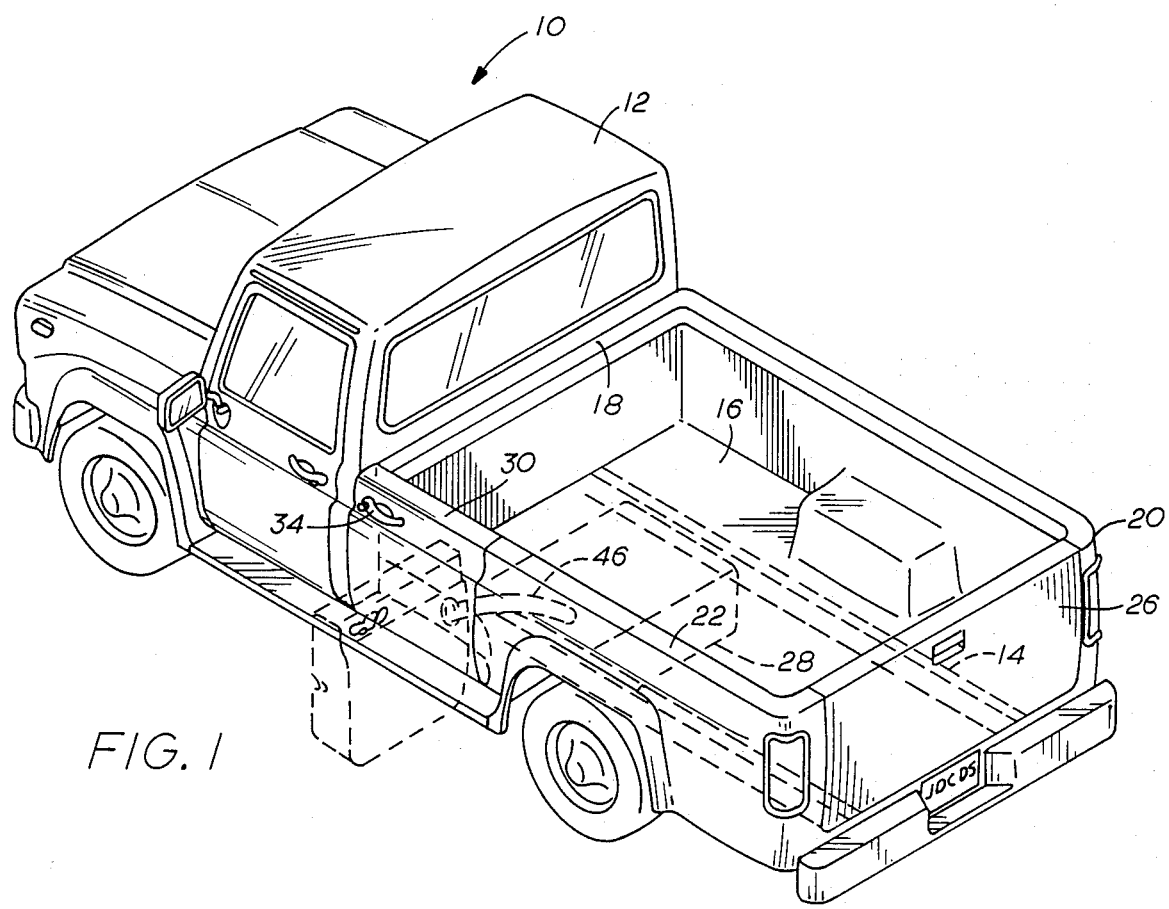
FIG. 1 is a perspective view of a pickup truck and a bed according to the present invention.
Figure 2:
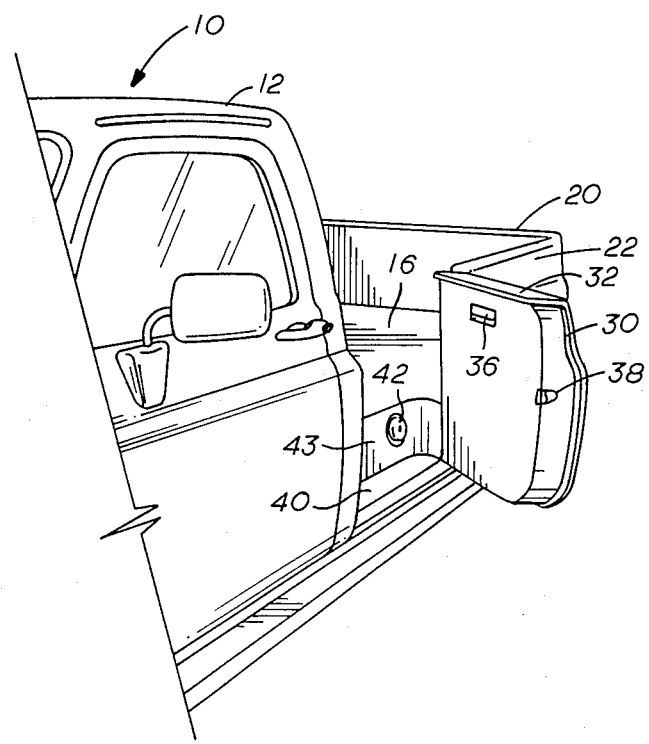
FIG. 2 is a perspective view of the pickup truck and bed of FIG. 1 as seen from a different angle.

With reference to FIGS. 1 and 2 in which like reference numerals indicate like parts, the vehicle 10 is a pickup truck having a conventional cab 12 and frame 14 extending lengthwise behind the cab 12. A bed 16 is positioned on frame 14 in a conventional manner. The bed 16 includes forward wall 18 and rear wall 20. Side walls 22, 24 extend longitudinally on either side of the bed 16 between the forward 18 and the rear wall 20. If desired, a tailgate 26 may be positioned in the rear wall 20. Fuel tank 28 is mounted with the frame 14 beneath the bed 16 in a conventional manner.

A vertically hinged passenger door 30 is mounted in the wall 22, preferably adjacent the forward wall 18 and the cab 12. The door 30 is a passenger-style door and opens from a top edge 32 of the side wall 22 and extends vertically downward to beneath an upper surface of the bed 16. The door 30 is provided with an exterior handle 34 and an interior handle 36 for operating conventional latch means 38 positioned on an opposite edge of the door from the hinge means. In the closed position, the door 30 presents surfaces which are generally flush or even with the other surfaces of the side wall 22. In an open position as illustrated in FIG. 2, the door 30 creates a portal vertically extensive with the side wall 22 above the bed 16 to facilitate ingress and egress of a passenger into and from the bed area 16. The handles 34 and 36 operate the latch means 38 in a conventional manner, as for a passenger door in the cab 12, except that there is generally no window and no means of unlocking the handles 34 and 36 other than by a keyway formed in the handle 34 and/or the handle 36.

The door 30 has a thickness and a step 40 is thereby formed in the bottom of the side wall 22 therebeneath to further facilitate ingress and egress. A port 42 is formed in vertical panel 43 between the bed 16 and the step 40. The port 42 facilitates introduction of fuel into tank 28 via fuel line 46 and is provided with a gas cap 44 which may, for example, be threadedly engaged with the port 42, sealed therewith and vented, as is conventional.

When the door 30 is in a closed position, the bed 16 has a normal appearance except for the handle 34 and the outlines of the door 30 in the side wall 22. The port 42 is conveniently concealed behind the door 30 and beneath the bed 16. Locking of the door 30 thus inhibits unauthorized access to the fuel port 42 unless one is in the possession of the proper key to unlock the handles 34 and/or 36. When the door 30 is opened, access may be gained to the fuel port 42, and ingress and egress to the bed area 16 simultaneously facilitated as described above.

The foregoing description of the invention is illustrative and exemplary thereof. Various other modifications in the size, materials and various components will occur to those skilled in the art. It is intended that all such variations within the scope and spirit of the appended claims be embraced thereby.

What is claimed is:

1. A utility vehicle comprising:
    a passenger cab;
    a frame extending lengthwise behind the cab;
    a bed mounted on top of the frame extending from adjacent the cab to a tail end;
    upstanding first and second side panels secured to opposite sides of the bed and extending substantially along the bed from adjacent the cab to adjacent the tail end;
    a vertically hinged door positioned in a said side panel for passenger access to said bed; and
    a port for filling a fuel tank concealed beneath said bed, a said port being positioned below an upper surface of said bed and behind said door for concealment of the port when the door is in a closed position and access thereto when the door is in an open position.

2. The vehicle of claim 1 wherein said vehicle is a pickup truck.

3. The vehicle of claim 2 wherein said side panels extend vertically above and below said bed.

4. The vehicle of claim 3 wherein said door is a passenger style door.

5. The vehicle of claim 4, further comprising a step on said side panel below said door.

6. The vehicle of claim 5 wherein said door has a top edge even with a top edge of said side panel.

7. The vehicle of claim 6, wherein said door extends vertically from adjacent said step to a top of said side panel.

8. The vehicle of claim 7, wherein said door opens outwardly from said bed.

9. The vehicle of claim 1 wherein said port includes a gas cap.

10. A bed mountable on a pickup truck, comprising:
    a floor having a forward end, a tail end and opposite longitudinal sides extending there between;
    a generally vertical side body member attached at each bed side;
    a vertically hinged passenger door mounted in one or both of said side body members, said door having a closed position wherein said side body member is continuous generally from said forward end to said tail end, and an open position wherein a portal vertically extensive above said bed is formed in said side body member; and
    means for receiving a fuel tank line and mounting a cap on the end thereof between said door and said bed side to conceal said cap behind said door in said closed position and to provide access to said cap in said open position.

11. The bed of claim 10, wherein means for stepping is mounted on said side body member beneath said door.

12. The bed of claim 10, further comprising a horizontally hinged gate mounted at said tail end of said floor.

13. The bed of claim 12, further comprising a wall at said forward end of said floor.

14. The bed of claim 10, further comprising means for locking said door in the closed position.

15. The vehicle of claim 1, further comprising means for locking said door in said closed position.

16. The bed of claim 13, wherein said bed has an open top.

17. The vehicle of claim 1, wherein said bed has an open top.

* * * * *